(12) United States Patent
Pallares

(10) Patent No.: US 7,334,724 B2
(45) Date of Patent: Feb. 26, 2008

(54) SYSTEM FOR OPERATING A PREPAID RELOADABLE DEBIT CARD HAVING ANCILLARY SERVICES

(76) Inventor: Enrique Pallares, 1831 Capeside Cir., Wellington, FL (US) 33414

( * ) Notice: Subject to any disclaimer, the term of this patent is extended or adjusted under 35 U.S.C. 154(b) by 197 days.

(21) Appl. No.: 11/016,142

(22) Filed: Dec. 17, 2004

(65) Prior Publication Data
US 2006/0138215 A1 Jun. 29, 2006

(51) Int. Cl.
G06K 5/00 (2006.01)
(52) U.S. Cl. ................................. 235/380; 235/375
(58) Field of Classification Search ................ 235/380, 235/379, 382, 382.5, 375, 492, 383
See application file for complete search history.

(56) References Cited

U.S. PATENT DOCUMENTS

| | | | |
|---|---|---|---|
| 2002/0066783 A1* | 6/2002 | Sawin | 235/379 |
| 2003/0074311 A1* | 4/2003 | Saylors et al. | 705/39 |
| 2005/0010478 A1* | 1/2005 | Gravelle | 705/16 |
| 2005/0080678 A1* | 4/2005 | Economy et al. | 705/16 |
| 2005/0209958 A1* | 9/2005 | Michelsen et al. | 705/39 |
| 2006/0001552 A1* | 1/2006 | Kojima | 340/928 |
| 2006/0027647 A1* | 2/2006 | Deane et al. | 235/380 |

* cited by examiner

Primary Examiner—Thien Minh Le
(74) Attorney, Agent, or Firm—Steven Schmid

(57) ABSTRACT

Disclosed is a system for operating a prepaid reloadable debit card. The system includes providing ancillary services associated with the prepaid reloadable debit card. The prepaid reloadable debit card is primarily directed to the "unbanked" population and may provide a means for remittance to immigrants for transferring funds to family members back home using existing ATM and credit card infrastructures.

5 Claims, 3 Drawing Sheets

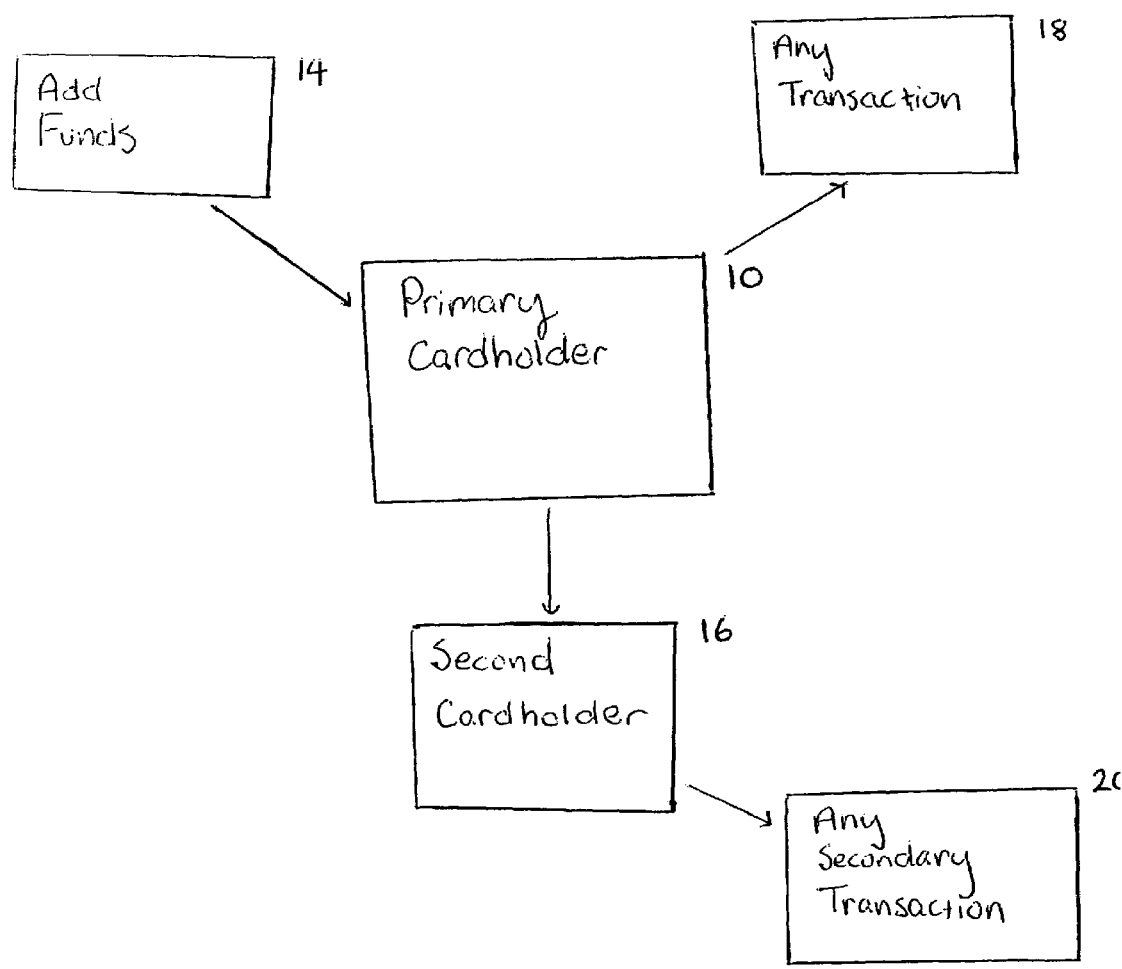

SYSTEM FOR OPERATING A PREPAID RELOADABLE DEBIT CARD HAVING ANCILLARY SERVICES

FIELD OF THE INVENTION

Figure 1:
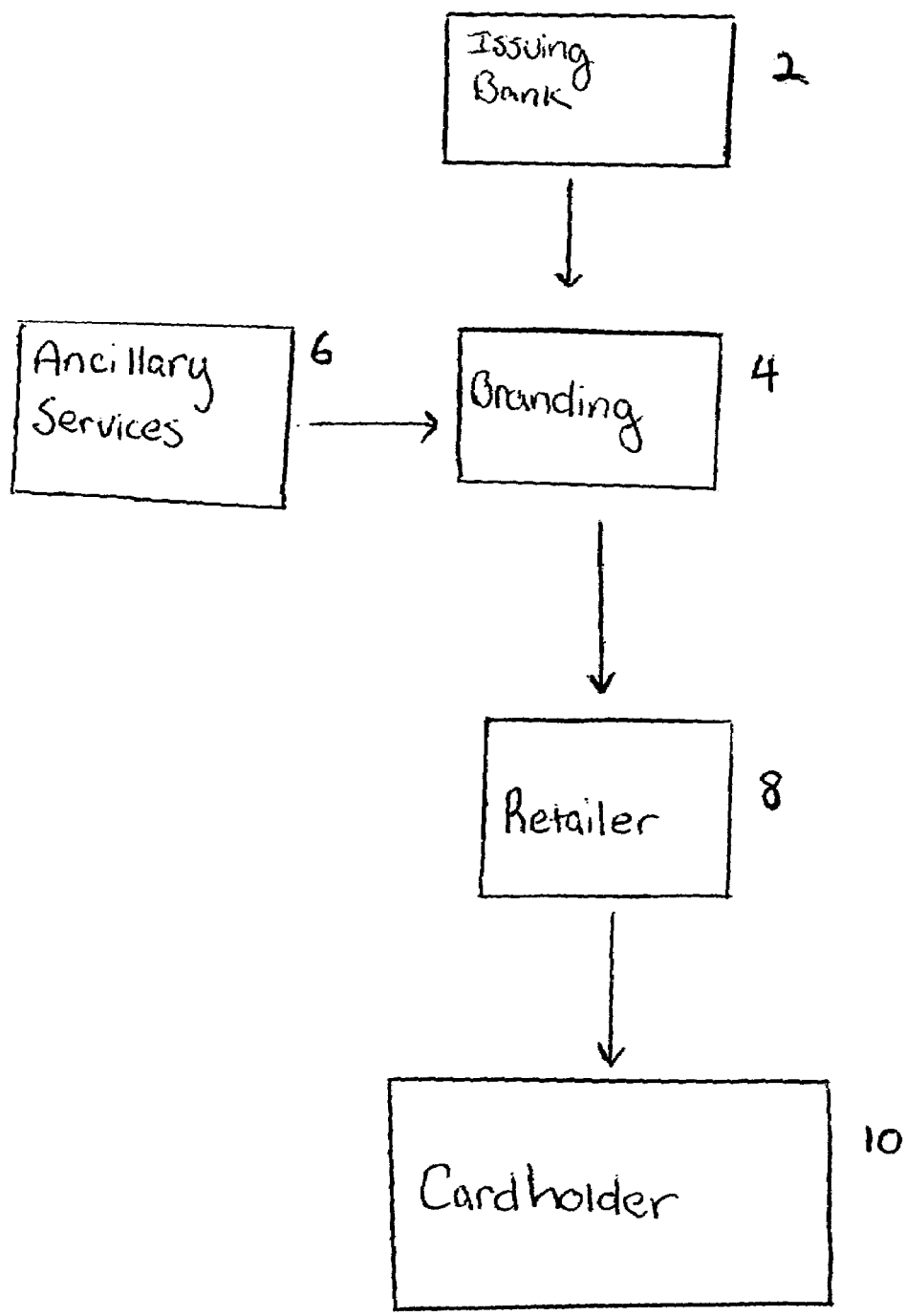

The present invention generally relates to a system for reloadable debit cards and in greater detail to a system for a reloadable debit card having associated ancillary services.

BACKGROUND

Early expressions of electronic commerce include the practice of "wiring" money from one individual to another over a telegraph system. Wiring of funds continues into the present time and generally consists of a deposit of cash, a certified check, or a similar instrument of a specific monetary amount plus a service fee, with an agent who then communicates an order to a distant agent to pay out the specific amount to an individual, a company, or a bank. Accounts are then settled conventionally, as by transfer of currency, clearance of checks, or the like. Electronic commerce may be generally defined as the exchange of monetary amounts for goods, services, or the like, without the direct use of currency, implemented by non-vocal electronic communications.

More recently, the use of credit cards and debit cards to make purchases often involves the electronic transfer of funds, including electronic messages of a request and then an authorization to debit a given amount from one account and credit that amount to another account. For example, purchasing a product over the Internet may involve the electronic submission of a credit card number, an electronic communication to the credit card issuer for authorization of a total purchase price, and an electronic debiting of the customer's account when the purchase process is completed. The use of such a card to obtain cash from an ATM (automatic teller machine) also involves the equivalent of an electronic transfer of funds, including the communication of an account number, a PIN (personal identification number), and a monetary amount to a bank, and a response of an authorization to dispense the requested amount of cash from the ATM. Electronic commerce benefits consumers and businesses in terms of convenience, security, and accounting.

The majority of present day electronic commerce activities require consumers to have at least an established bank account and usually one or more credit card accounts. There are many persons, not only in the United States but throughout the world, who could benefit from electronic (i.e., "unbanked") commerce but who do not have established bank or credit card accounts. While electronic transactions constitute a considerable percentage of current commercial transactions, the benefits of electronic commerce could be expanded to a much greater degree by new methods, infrastructure, and equipment.

The millions of "unbanked" people generally carry out financial transactions by the use of cash, money order, stored value card, or a similar vehicle that does not require a bank to complete the transaction. The use of cash to purchase goods and services is much more cumbersome to the person, as many of the transactions require some interface with a person, whether it be for the purchase of a money order, or the actual payment to an attendant or clerk representative.

An example member of the "unbanked" community includes immigrants and in particular Hispanic immigrants. One important need of the immigrant community is to transfer money back to family members in their home country. The current forms of domestic and international money transfer services offered today are very labor intensive for both the person sending the money as well as the service provider. The amount of paperwork that has to be filled out by the sender and then manually transcribed into a "communication system" by the service provider has been the ostensible justification to the customer of the high fee structure to provide this service. Some service providers, such as Western Union, use relatively "high tech" electronic communication services to transfer funds while other small service providers use "low tech" courier services to physically transport funds to their intended destination.

Currently, there are several organizations that sell domestic or international electronic person-to-person money transfers as long as the sending and receiving parties deposit and pick up the remitted funds within the same organizational network of geographically dispersed branch offices. Fees for this service can range upwards from $35 per transfer. However, convenient remittance locations for the local sender may not have corresponding convenient delivery locations for the remote receiver, or vice-versa.

In addition to financial services related to the transfer of money, immigrants are also in need of access to other basic services. Such services include access to medical care at a reasonable cost and legal counseling. Immigrants often lack medical insurance and are unfamiliar with the U.S. legal system. Legal advice often takes the form of advice regarding such common matters as immigration issues and traffic tickets. Additionally, immigrants need term life insurance, especially when the immigrant dies in the U.S. since the immigrant is the main source of income for the family and due to traditions the body of the deceased needs to be brought back to their home country.

Thus, what is needed is a method that will allow the "unbanked" communities the opportunity to make remittances and purchases along with a method that can provide needed services.

SUMMARY

The present invention provides a system for operating a prepaid reloadable debit card. The system includes providing ancillary services associated with the prepaid reloadable debit card. The prepaid reloadable debit card is primarily directed to the "unbanked" population and may provide a means for remittance for transferring funds to family members of immigrants residing outside of the U.S. using existing ATM and credit card infrastructures.

In greater detail, the ancillary services associated with the prepaid reloadable debit card include roadside assistance, discounted medical services, discounted pharmaceuticals, legal counseling and term life insurance. Furthermore, ancillary services may include phone cards and loyalty points or incentives. Additionally, the prepaid reloadable debit card may be activated by any reseller. Example resellers include gas stations, convenience stores, employer payrolls, call centers and combinations thereof. The prepaid reloadable debit card may have an initial value or the value of the card can be determined at the time purchase by the cardholder depending upon the amount loaded onto the card.

The prepaid reloadable debit card may be used for a plurality of transactions, with each successive one of the plurality of transactions decreasing the remaining value on the prepaid reloadable debit card. Additionally, the prepaid reloadable debit card may be a remittance card.

In a further embodiment, the system for operating a prepaid reloadable debit card includes providing a first prepaid reloadable debit card having a primary account to a primary cardholder. The primary cardholder is typically the individual who purchased the card from the retailer. The system then includes providing a second prepaid reloadable debit card linked to the primary account of the primary cardholder. Typically, the second card is a remittance card. The remittance card may be sent via mail currier to a relative of the immigrant residing in a country outside of the U.S. Thus, an immigrant's family may be sent money via the second prepaid reloadable debit card. Additionally, ancillary services are associated with the prepaid reloadable debit cards.

An additional embodiment includes a system for operating a prepaid reloadable debit card wherein a first prepaid reloadable debit card is provided having a primary account to a primary card holder and a second prepaid reloadable debit card linked to the primary account of the primary card holder. The second prepaid reloadable debit card is a remittance card. Furthermore, ancillary services associated with the prepaid reloadable debit cards are provided, wherein the ancillary services are selected from the group consisting of roadside assistance, discounted medical services, discounted pharmaceuticals, legal counseling, term life insurance and combinations thereof.

DRAWINGS

Figure 2:
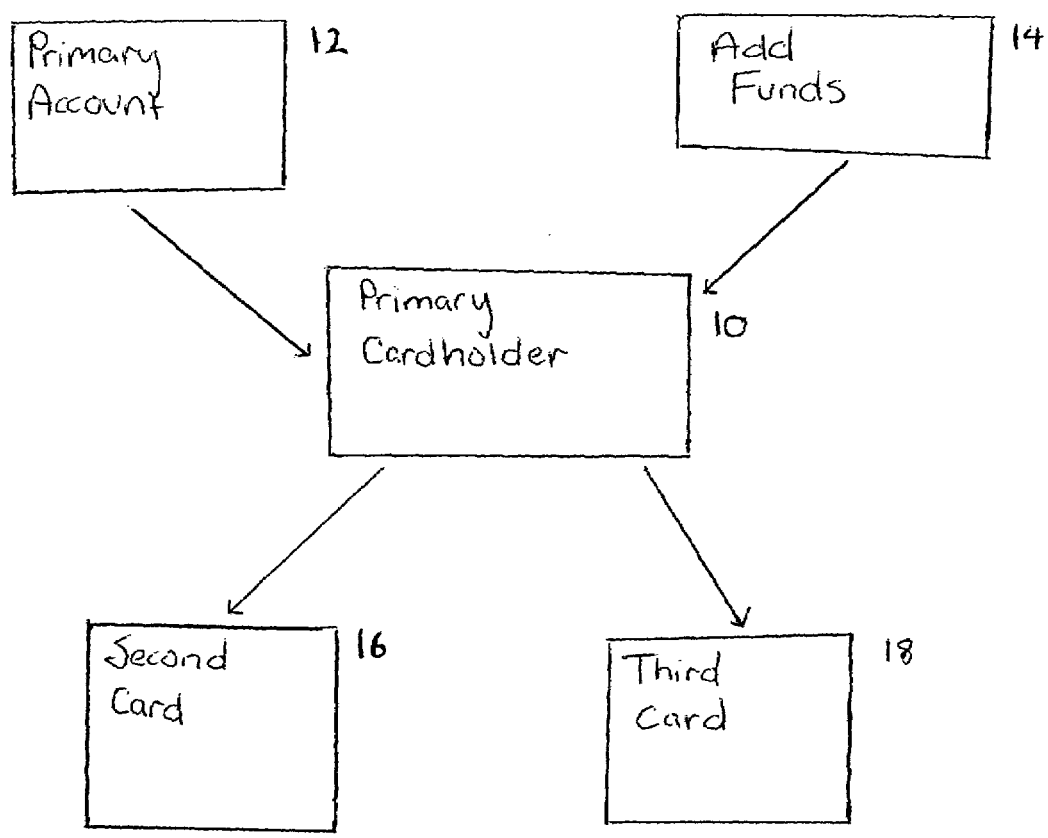

In the Drawings:

FIG. 1 depicts a block diagram showing the issuing and branding of the card, the card's distribution to a retailers and ultimately to a cardholder or customer;

FIG. 2 is a block diagram illustrating that the primary cardholder may have more than one card, wherein the additional cards may be issued in another's name and linked to the primary account of the primary cardholder such that the second card functions a remittance card the process flow diagram of the present system; and FIG. 3 is a further block diagram illustrating that the cards may be used for any transaction including an ATM transaction or purchase since the cards may be branded with the VISA or MASTERCARD logo and function as the same.

DETAILED DESCRIPTION

Disclosed is a system for operating a prepaid reloadable debit card. The system includes providing ancillary services associated with the prepaid reloadable debit card. The prepaid reloadable debit card is primarily directed to the "unbanked" population and may provide a means for remittance to immigrants for transferring funds to family members back home using existing ATM and credit card infrastructures.

Loading refers to a process whereby a cardholder authorizes a transfer of funds into an account associated with a stored-value card. The card is thereby authorized to be used for payment of future purchases, up to the amount of the loaded value. When the cardholder presents the card to a merchant as payment for a purchase, funds to cover the amount of the purchase are transferred from the account to the merchant's account. The amount of funds transferred is accordingly debited from the account associated with the stored-value card. Optionally, the stored-value card may also be reloaded with value in order to replenish the monetary funds for available for card transactions.

Example existing ATM/credit card infrastructures include standard computer data processing telecommunications networks for transmitting authorization requests is the VISA. RTM. credit transaction network. In addition to VISA. RTM. credit cards, merchants connected to this network may seek authorization for approval of transactions involving other credit cards, such as MASTER CARD. RTM. and DISCOVER. RTM. credit or debits cards. The VISA. RTM. credit transaction network includes a plurality of data processors and financial institutions, all interconnected through telecommunication links which, based on a six digit bank identification number (BIN), route all authorization requests to the appropriate card-issuer and all authorization responses back to the requesting merchant.

As illustrated in FIG. 1, the present system may include an issuing bank 2 that issues the initial prepaid reloadable debit card. The issued card is then branded 4 and packaged with various ancillary services 6 for resale to various retailers 8 who in turn sell the card to a customer or cardholder 10. The retailer 8 may be any outlet capable of selling the card to a potential cardholder. By way of example, but not by limitation, retailers 8 include call centers, gas stations, convenience stores and payroll departments of a cardholder's 10 employer. Essentially, a retailer 8 may be any outlet that can interact with a potential cardholder and can also include interaction via the internet or by kiosks placed in strategic locations.

Branding 4 may include placing a indicia on the card that may indicate origin or type of services provided with the card. An example indicia that may be placed on the card may be FAMILIA™. The FAMILIA™ line of debit cards includes ancillary services 6 that may be helpful to an immigrant and especially to a Hispanic immigrant. Other branding names or indices are also contemplated in the present system.

Ancillary services 6 are associated with the debit card. These ancillary services are typically included in the price of the card and are used as an inducement for purchasing the card from the retailer 8. Branding 4 aids the potential customer in determining what ancillary services 6 are provided with the branded card. By way of example, but not limitation, ancillary services 6 associated with a branded debit card may include roadside assistance, discounted medical services, discounted pharmaceuticals, legal counseling and term life insurance. Other ancillary services 6 include phone service and loyalty points. The present system is not limited by the number and type of services provided and may include other services in different embodiments not listed herein.

As illustrated in FIG. 2, the present system may include one or more remittance cards. The cardholder may order any number of card embossed with a different name. The first card is issued to the primary cardholder 10 who holds the primary account 12. A second card 16 may be issued in another's name and linked to the primary cardholder's 10 primary account 12. The primary cardholder 10 has the options of loading the second card 16 with any amount of money from the primary account 12. Typically, a limit of $5,000 per day is imposed on the amount that may be loaded on the card per day. Additionally, a limit of up to five cards per cardholder may be established. Of course, more cards may be issued and the limit of $5,000 may be increased or removed.

The second card 16 is typically used a remittance card which can be sent by the primary cardholder 10 to a secondary cardholder who resides in a local outside of the United States. Typically, this is an immigrant who wishes to send money to a relative back home. The second card can be in the name of the second cardholder and the card can used as any debit card or credit card.

In FIG. 3 there is illustrated a block diagram showing that the primary cardholder may add funds 14 to the primary card and use the primary card for any primary transaction 18 such purchasing goods or using the card as a ATM card to access funds stored on the card's account. Additionally shown is a secondary cardholder 16 conducting any secondary transaction 20 such as using the card as a ATM card to access funds that have been transferred to the secondary cardholder 16 or used to purchase goods and services.

While Applicants have set forth embodiments as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

The invention claimed is:

1. A system for operating a prepaid reloadable debit card comprising:

providing a first prepaid reloadable debit card having a primary account to a primary card holder;

providing a second prepaid reloadable debit card linked to the primary account of the primary card holder, wherein the second prepaid reloadable debit card is a remittance card; and providing ancillary services associated with the prepaid reloadable debit cards, wherein the ancillary services are selected from the group consisting essentially of roadside assistance, discounted medical services, discounted pharmaceuticals, legal counseling, term life insurance and combinations thereof.

2. The system of claim 1, further comprising activating the prepaid reloadable debit card by a reseller.

3. The system of claim 2, wherein the reseller is selected from the group consisting of gas stations, convenience stores, employer payrolls, call centers and combinations thereof.

4. The system of claim 1, wherein the prepaid reloadable debit card has an initial value.

5. The method of claim 1, wherein the prepaid reloadable debit card may be used for a plurality of transactions, and wherein each successive one of the plurality of transactions decreases a remaining value on the prepaid reloadable debit card.

* * * * *